(12) United States Patent
Yuan (10) Patent No.: US 10,104,502 B2
(45) Date of Patent: Oct. 16, 2018

(54) METHOD AND DEVICE FOR IMPLEMENTING INTERNET SERVICES

(71) Applicant: Alibaba Group Holding Limited, George Town (KY)

(72) Inventor: Zhijun Yuan, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/502,753

(22) PCT Filed: Aug. 3, 2015

(86) PCT No.: PCT/CN2015/085912
§ 371 (c)(1),
(2) Date: Feb. 8, 2017

(87) PCT Pub. No.: WO2016/023426
PCT Pub. Date: Feb. 18, 2016

(65) Prior Publication Data
US 2017/0238137 A1      Aug. 17, 2017

(30) Foreign Application Priority Data

Aug. 15, 2014  (CN) .......................... 2014 1 0403495

(51) Int. Cl.
*H04W 24/00* (2009.01)
*H04W 4/02* (2018.01)
*H04L 29/08* (2006.01)
*H04W 84/12* (2009.01)

(52) U.S. Cl.
CPC ............ *H04W 4/023* (2013.01); *H04L 67/16* (2013.01); *H04W 84/12* (2013.01)

(58) Field of Classification Search
CPC ........ H04W 4/023; H04W 84/12; H04L 67/16
USPC .......................... 455/456.3, 414.1, 418, 410
See application file for complete search history.

(56) References Cited

U.S. PATENT DOCUMENTS

| | | | |
|---|---|---|---|
| 2008/0004950 A1 | 1/2008 | Huang | |
| 2012/0057579 A1* | 3/2012 | Kim ........................ | H04W 4/00 370/338 |
| 2012/0239500 A1 | 9/2012 | Monahan | |
| 2015/0003616 A1* | 1/2015 | Middlemiss ............ | H04S 7/303 381/17 |

(Continued)

FOREIGN PATENT DOCUMENTS

| | | |
|---|---|---|
| CN | 101741704 | 6/2010 |
| CN | 101959321 | 1/2011 |

(Continued)

*Primary Examiner* — Nghi H Ly
(74) *Attorney, Agent, or Firm* — Van Pelt, Yi & James LLP (57) ABSTRACT

Providing internet service comprises: obtaining one or more wireless signals respectively associated with one or more corresponding network devices; obtaining one or more network device identifiers associated with at least one of the one or more wireless signals based at least in part on analysis of the one or more wireless signals; determining that at least one of the one or more network device identifiers corresponds to an Internet service, wherein the Internet service is dependent at least in part on a physical location of a terminal associated with the wireless signal; and accessing the Internet service associated with the at least one of the one or more network device identifiers corresponding to the Internet service.

17 Claims, 10 Drawing Sheets

(56) References Cited

U.S. PATENT DOCUMENTS

2016/0044510 A1* 2/2016 Lafuente ............... H04W 12/06
455/411

FOREIGN PATENT DOCUMENTS

| CN | 102246162 | 11/2011 |
| CN | 102685674 | 9/2012 |
| CN | 102800003 | 11/2012 |
| CN | 103619000 | 3/2014 |

* cited by examiner

METHOD AND DEVICE FOR IMPLEMENTING INTERNET SERVICES

CROSS REFERENCE TO OTHER APPLICATIONS

This application claims priority to International (PCT) Application No. PCT/CN2015/085912 entitled METHOD AND DEVICE FOR ACHIEVING O2O INTERNET SERVICE, filed Aug. 3, 2015 which is incorporated herein by reference for all purposes, which claims priority to People's Republic of China Patent Application No. 201410403495.2 entitled METHOD AND DEVICE FOR REALIZING O2O INTERNET SERVICE, filed Aug. 15, 2014 which is incorporated herein by reference for all purposes.

FIELD OF THE INVENTION

The present application relates to a field of network communications technology. In particular, it relates to a method and a device for implementing Internet services.

BACKGROUND OF THE INVENTION

As network communications technology develops, it becomes not only possible to acquire various kinds of information online, but also to shop and do other things online. Many O2O Internet service providers not only have stores on the Internet (also called online stores), but also have physical stores offline (also called offline stores). These O2O Internet service providers can provide O2O (Online-to-Offline) Internet services. That is, they combine offline commercial opportunities with the Internet in such a way that the Internet becomes the front desk for offline transactions.

The method that is often used now to implement O2O Internet services is the following: acquire the current location information for a mobile terminal using the mobile terminal's location-based services (LBS); use the current location information for the mobile terminal to search for O2O Internet services in the vicinity of the mobile terminal; push found O2O Internet services to the mobile terminal; the user uses the pushed O2O Internet services as a basis for determining to use an O2O Internet service by having the mobile terminal log on to a corresponding O2O Internet service page.

However, the existing method for implementing O2O Internet services requires the use of mobile terminal LBS to acquire the current location information for a mobile terminal. Accurate location is impossible while indoors. When the user of a mobile terminal is indoors, it is not possible to acquire current location information for the mobile terminal or provide the user with accurate O2O Internet services.

SUMMARY OF THE INVENTION

The technical problem that the present application seeks to solve lies in a method and a device for implementing O2O Internet services. It uses the WiFi router identifier for WiFi signals in the vicinity of a mobile terminal as a basis for providing O2O Internet service to the mobile terminal user. Even when the mobile terminal user is indoors, it can provide the mobile terminal user accurate O2O Internet service associated with the user's current location.

To solve the problem described above, the present application discloses a method of implement O2O Internet services. Said method comprises: acquiring at least one WiFi signal scanned by a mobile terminal; analyzing said WiFi signals that meet set conditions in order to obtain first WiFi router identifiers corresponding to each of said analyzed WiFi signals; determining a second WiFi router identifier that is matched with an O2O Internet service from among the first WiFi router identifiers corresponding to each of said WiFi signals; using the Web operating environment built into said mobile terminal to acquire an O2O Internet service matched with said second WiFi router identifier.

Furthermore, determining a second WiFi router identifier that is matched with an O2O Internet service from among the first WiFi router identifiers corresponding to each of said WiFi signals comprises: comparing the first WiFi router identifier corresponding to each of said WiFi signals with WiFi router identifiers for O2O Internet services registered on an O2O Internet service platform; determining the first WiFi router identifier whose comparison result is the same to be the second WiFi router identifier, which is matched with an O2O Internet service.

Furthermore, after acquiring an O2O Internet service matched with said second WiFi router identifier, it further comprises: acquiring descriptive store information for an O2O Internet service provider of an O2O Internet service matched with said second WiFi router identifier; recording the descriptive store information for an O2O Internet service provider of an O2O Internet service matched with said second WiFi router identifier.

Furthermore, said WiFi signals that meet set conditions comprise: the strongest WiFi signal among said acquired WiFi signals; or of said acquired WiFi signals, those WiFi signals whose strength exceeds a set threshold value; or a preset quantity of said acquired WiFi signals ranked in strong-to-weak signal strength order.

Furthermore, prior to acquiring at least one WiFi signal scanned by a mobile terminal, it further comprises: acquiring an O2O Internet service registry, wherein said O2O Internet service registry comprises registration information on multiple O2O Internet service providers that provide O2O Internet services, wherein said registration information on the O2O Internet service providers comprises O2O Internet service addresses of said O2O Internet service providers and WiFi router identifiers for said O2O Internet service providers; storing said O2O Internet service registry.

Furthermore, said registration information on the O2O Internet service providers further comprises: descriptive store information about said O2O Internet service providers, wherein said descriptive store information is used by the user of said mobile terminal for identifying and shopping, or said descriptive store information is used by said mobile terminal for navigation to said store location.

Furthermore, acquiring the O2O Internet service matched with said second WiFi router identifier comprises: using said second WiFi router identifier as a basis for determining an O2O Internet service address included in the corresponding registration information; using said O2O Internet service address as a basis for acquiring an O2O Internet service matched with said second WiFi router identifier.

Furthermore, after using the Web operating environment built into said mobile terminal to acquire an O2O Internet service matched with said second WiFi router identifier, it further comprises: receiving the WiFi code that is sent by the WiFi router corresponding to said second WiFi router identifier; on the basis of said WiFi code using the WiFi signal provided by the WiFi router corresponding to said second WiFi router identifier to connect to the Internet.

Furthermore, after using the Web operating environment built into said mobile terminal to acquire an O2O Internet service matched with said second WiFi router identifier, it further comprises: using said mobile terminal to log onto an O2O Internet service matched with said second WiFi router identifier and submitting service subscription information; receiving service subscription result information corresponding to said service subscription information.

Furthermore, after using the Web operating environment built into said mobile terminal to acquire an O2O Internet service matched with said second WiFi router identifier, it comprises: using the Web operating environment built into said mobile terminal to receive an O2O Internet service pushed by an O2O Internet service provider matched with said second WiFi router identifier; or after receiving a service acquisition trigger instruction, using the Web operating environment built into said mobile terminal to acquire an O2O Internet service matched with said second WiFi router identifier.

Furthermore, said O2O Internet service comprises: pushed information provided by the O2O Internet service provider, or service information provided by the O2O Internet service provider, or descriptive information provided by the O2O Internet service provider.

To solve the problem described above, the present application further discloses a device for implementing O2O Internet services. Said device comprises: a first acquiring module, for acquiring at least one WiFi signal scanned by a mobile terminal; an analyzing module, for analyzing said WiFi signals that meet set conditions in order to obtain first WiFi router identifiers corresponding to each of said analyzed WiFi signals; a determining module, for determining a second WiFi router identifier that is matched with an O2O Internet service from among the first WiFi router identifiers corresponding to each of said WiFi signals; a second acquiring module, for using the Web operating environment built into said mobile terminal to acquire an O2O Internet service matched with said second WiFi router identifier.

Furthermore, said determining module comprises: a comparing unit, for comparing the first WiFi router identifier corresponding to each of said WiFi signals with WiFi router identifiers for O2O Internet services registered on an O2O Internet service platform; a determining unit, for determining the first WiFi router identifier whose comparison result is the same to be the second WiFi router identifier, which is matched with an O2O Internet service.

Furthermore, said device further comprises: a third acquiring module, for acquiring descriptive store information for an O2O Internet service provider of an O2O Internet service matched with said second WiFi router identifier; a first recording module, for recording the descriptive store information for an O2O Internet service provider of an O2O Internet service matched with said second WiFi router identifier.

Furthermore, said WiFi signals that meet set conditions comprise: the strongest WiFi signal among said acquired WiFi signals; or of said acquired WiFi signals, those WiFi signals whose strength exceeds a set threshold value; or a preset quantity of said acquired WiFi signals ranked in strong-to-weak signal strength order.

Furthermore, said device further comprises: a fourth acquiring module, for acquiring an O2O Internet service registry, wherein said O2O Internet service registry comprises registration information on multiple O2O Internet service providers that provide O2O Internet services, wherein said registration information on O2O Internet service providers comprises O2O Internet service addresses of said O2O Internet service providers and WiFi router identifiers for said O2O Internet service providers; a storage module, for storing said O2O Internet service registry.

Furthermore, said registration information on O2O Internet service providers further comprises: descriptive store information about said O2O Internet service providers, wherein said descriptive store information is used by the user of said mobile terminal for identifying and shopping, or said descriptive store information is used by said mobile terminal for navigation to said store location.

Furthermore, said second acquiring module comprises: a processing unit, for using said second WiFi router identifier as a basis for determining an O2O Internet service address included in the corresponding registration information; an acquiring unit, for using the O2O Internet service address as a basis for acquiring the O2O Internet service matched with said second WiFi router identifier.

Furthermore, said device further comprises: a first receiving module, for receiving the WiFi code that is sent by the WiFi router corresponding to said second WiFi router identifier; a processing module, for, on the basis of said WiFi code, using the WiFi signal provided by the WiFi router corresponding to said second WiFi router identifier to connect to the Internet.

Furthermore, said device further comprises: a submitting module, for using said mobile terminal to log onto an O2O Internet service matched with said second WiFi router identifier and submitting service subscription information; a second receiving module, for receiving service subscription result information corresponding to said service subscription information.

Furthermore, said second acquiring module comprises: a first receiving unit, for using the Web operating environment built into said mobile terminal to receive an O2O Internet service pushed by an O2O Internet service provider matched with said second WiFi router identifier; or a second receiving unit, for, after receiving a service acquisition trigger instruction, using the Web operating environment built into said mobile terminal to acquire an O2O Internet service matched with said second WiFi router identifier.

Furthermore, said O2O Internet service comprises: pushed information provided by the O2O Internet service provider, or service information provided by the O2O Internet service provider, or descriptive information provided by the O2O Internet service provider.

The present application can obtain at least the following technical results: 1) It provides O2O Internet services based on WiFi router identifiers of WiFi signals. Since all the WiFi signals scanned by a mobile terminal are WiFi signals in the vicinity of the mobile terminal, and O2O Internet service is provided to the mobile terminal user according to the WiFi router identifier for WiFi signals in the vicinity of the mobile terminal, it can provide the mobile terminal user accurate O2O Internet service associated with the user's current location even when the mobile terminal user is indoors.

2) Acquiring at least one WiFi signal scanned by a remote terminal and providing O2O Internet service based on the WiFi signal's WiFi router identifier does not require the remote terminal user to perform any preceding step. The matching is automatic, and the interactions are simple.

3) The O2O Internet service corresponding to the WiFi signal with the greatest signal strength is provided on the basis of the WiFi signal strength and the WiFi router identifier. The O2O Internet service provided for the mobile terminal user is nearer to the mobile terminal user and is more convenient to the user.

4) Successfully matched O2O Internet services are automatically recorded. That is, visited O2O Internet service provider physical stores are automatically recorded for the convenience of repeat visits by users.

Of course, any product that implements the present application does not have to simultaneously achieve all of the technical results described above.

BRIEF DESCRIPTION OF THE DRAWINGS

The drawings described here are both intended to further the understanding of the present application and form a part of the present application. The exemplary embodiments of the present application and the descriptions thereof are intended to explain the present application and do not constitute inappropriate limitation of the present application. Among the drawings.

DETAILED DESCRIPTION

Implementations of the present application are explained in detail below in light of the attached drawings and embodiments in order to provide an adequate understanding of how the present application applies technical means to solve technical problems and achieve technical effects and to provide a basis for implementation of the same.

In one typical configuration, computer equipment comprises one or more processors (CPUs), input/output interfaces, network interfaces and memory.

Memory may include such forms as volatile memory in computer-readable media, random access memory (RAM) and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technique. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include transitory computer-readable media, (transitory media), such as modulated data signals and carrier waves.

DESCRIPTION OF EMBODIMENTS

Figure 1:
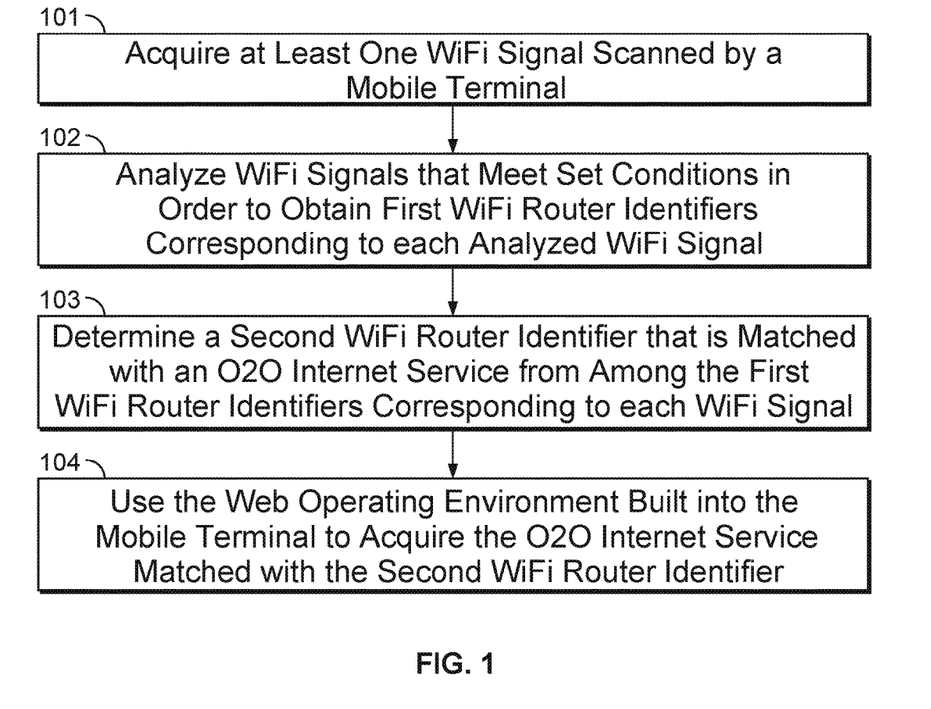
FIG. 1 is a flowchart of a first method of implementing O2O Internet services in an embodiment of the present application.

The embodiments below serve to provide a further explanation of how the present application methods are implemented. As shown in FIG. 1, which is a flowchart of a method of implementing O2O Internet services in an embodiment of the present application, the method comprises:

S101: Acquire at least one WiFi (Wireless Fidelity) signal scanned by a mobile terminal.

In particular, if the mobile terminal's WiFi is activated, the mobile terminal's OS (Operating System) (such as Android™) will automatically scan for WiFi signals in the vicinity and will find at least one WiFi signal sent by a broadcasting mechanism.

To make it possible to acquire in real time at least one WiFi signal sent through a broadcasting mechanism, it is possible to register and monitor broadcasts with WiFi signal scans and acquire in real time at least one most recently scanned WiFi signal sent by a broadcasting mechanism.

S102: Analyze WiFi signals that meet set conditions in order to obtain first WiFi router identifiers corresponding to each analyzed WiFi signal.

The WiFi router identifier specifically may be the BSSID (Basic Service Set ID) of the WiFi router. The BSSID is the WiFi router's physical address, which can uniquely identify this WiFi router.

WiFi signals that meet set conditions include:

the strongest WiFi signal among the acquired WiFi signals; or those acquired WiFi signals whose strength exceeds a set threshold value; or a preset quantity of acquired WiFi signals ranked in strong-to-weak signal strength order.

S103: Determine a second WiFi router identifier that is matched with an O2O Internet service from among the first WiFi router identifiers corresponding to each WiFi signal.

Specifically, in order to implement O2O Internet services through the method of the present embodiment, the O2O Internet service provider that can provide O2O Internet services is registered in advance on an O2O Internet service platform. When an O2O Internet service provider is registered on the O2O Internet service platform, the submitted registration information includes: descriptive store information (such as a store introduction and the store's geographic location) about the O2O Internet service provider, the O2O Internet service address (such a URL that browsers may directly access) of the O2O Internet service provider and a WiFi router identifier (such as the BSSID for a WiFi router) of the O2O Internet service provider. The descriptive store information is used by mobile terminal users for identifying service provider, or the descriptive store information is used by mobile terminals for navigation to the store location. Moreover, O2O Internet service providers can publish O2O Internet services in the form of Web apps.

Determining a second WiFi router identifier that is matched with an O2O Internet service from among the first WiFi router identifiers corresponding to each WiFi signal comprises:

comparing the first WiFi router identifier corresponding to each WiFi signal with WiFi router identifiers for O2O Internet services registered on an O2O Internet service platform;

determining the first WiFi router identifier whose comparison result is the same to be the second WiFi router identifier, which is matched with an O2O Internet service.

S104: Use the Web operating environment built into the mobile terminal to acquire the O2O Internet service matched with the second WiFi router identifier.

The Web operating environment built into the mobile terminal could be, for example, a 2G or 3G Web in the mobile terminal.

Using the Web operating environment built into a mobile terminal to acquire an O2O Internet service matched with a second WiFi router identifier comprises:

using the Web operating environment built into a mobile terminal to receive an O2O Internet service pushed by an O2O Internet service provider matched with a second WiFi router identifier; or after receiving a service acquisition trigger instruction, using the Web operating environment built into a mobile terminal to acquire an O2O Internet service matched with a second WiFi router identifier.

Specifically, the service acquisition trigger instruction could be sent only when it is determined that there is a need to use an O2O Internet service. Only then is an O2O Internet service matched with a second WiFi router identifier acquired using the Web operating environment built into a mobile terminal. This can conserve traffic for the Web built into a mobile terminal.

Acquiring an O2O Internet service matched with a second WiFi router identifier comprises:

using the second WiFi router identifier as a basis for determining an O2O Internet service address included in the corresponding registration information;

using the O2O Internet service address as a basis for acquiring an O2O Internet service matched with the second WiFi router identifier.

Specifically, since all the WiFi signals scanned by a mobile terminal are WiFi signals in the vicinity of the mobile terminal, using the WiFi router identifier for WiFi signals in the vicinity of the mobile terminal as a basis for providing O2O Internet service to the mobile terminal user can happen when the mobile terminal user is indoors and can provide the mobile terminal user accurate O2O Internet service associated with the user's current location.

Specifically, O2O Internet services comprise: pushed information provided by O2O Internet service providers, service information provided by O2O Internet service providers or descriptive information provided by O2O Internet service providers.

Specifically, when the Web operating environment built into a mobile terminal serves to acquire an O2O Internet service matched with a second WiFi router identifier, it has already been determined that the mobile terminal user is located in a physical store or in the vicinity of a physical store. Therefore, after the Web operating environment built into a mobile terminal serves to acquire an O2O Internet service matched with a second WiFi router identifier, it further comprises:

receiving the WiFi code that is sent by the WiFi router corresponding to the second WiFi router identifier;

on the basis of the WiFi code using the WiFi signal provided by the WiFi router corresponding to the second WiFi router identifier to connect to the Internet.

Or, after the Web operating environment built into a mobile terminal serves to acquire an O2O Internet service matched with a second WiFi router identifier, it further comprises:

using the mobile terminal to log on to an O2O Internet service matched with the second WiFi router identifier and submitting service subscription information;

receiving service subscription result information corresponding to said service subscription information.

In accordance with the above descriptions, the application scenarios of the O2O Internet service of the present embodiment may comprise:

a: Automatic Recommendation of a Menu and Online Ordering

After the mobile terminal user uses the O2O Internet service, he or she can obtain special-price and special-dish menus recommended by the O2O Internet service and can directly place an order. This can solve the problem of insufficient information in traditional menus and can also help O2O Internet service provider save on service costs.

b: Waiting in Line and Having Your Number Called

After a restaurant clears tables, and after a mobile terminal user uses the O2O Internet network service, it is possible join the online queue until one's number is called. The O2O Internet service provider may send a message to the user's mobile terminal notifying him or her of the availability of a table, thereby solving the problem of users needing to wait near the restaurant.

c: Automatic Recommendations of Hot Products and Online Payment and Orders

After a mobile terminal user who is browsing products in a store uses an O2O Internet service, he or she can see recommended hot products. This enables the user to save on product searching time.

d: Automatically Sending Coupons

When a mobile terminal user is passing by a store, a store coupon may be automatically sent based on a notification center for the purpose of drawing the user into the store to spend. It's also an even more convenient way for users to use coupons.

e: Automatically Connecting to a WiFi Signal

When a mobile terminal user is in a physical store or in the vicinity of a physical store, a WiFi code is automatically sent to the mobile terminal enabling the mobile terminal to automatically connect with the WiFi signal and to use the WiFi signal to connect to the Internet.

Figure 2:
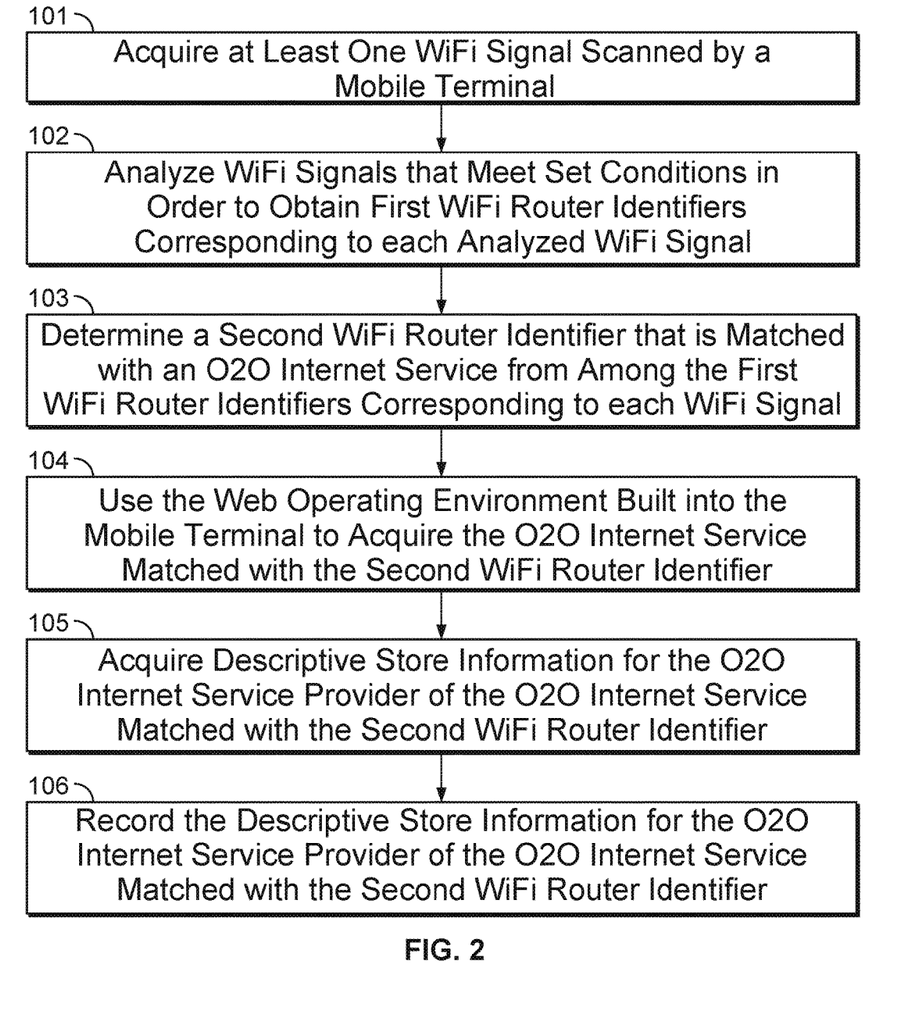
FIG. 2 is a flowchart of a second method of implementing O2O Internet services in an embodiment of the present application.

Refer to FIG. 2, which is a flowchart of a method of implementing O2O Internet services in an embodiment of the present application. After S104, using the Web operating environment built into a mobile terminal to acquire the O2O Internet service matched with a second WiFi router identifier, it further comprises:

S105: Acquire descriptive store information for the O2O Internet service provider of the O2O Internet service matched with the second WiFi router identifier.

S106: Record the descriptive store information for the O2O Internet service provider of the O2O Internet service matched with the second WiFi router identifier.

Specifically, when the O2O Internet service matched with the second WiFi router identifier is acquired, i.e., after the WiFi router identifier has been successfully matched, record the descriptive store information for the O2O Internet service provider of the O2O Internet service matched with the second WiFi router identifier. This will enable the mobile terminal user to conveniently find a store's geographic location by using the store's descriptive information that is among previously browsed stores in the matched history and thus to revisit a previously visited store. Additionally, this will bring more old customers to the O2O Internet service provider.

Figure 3:
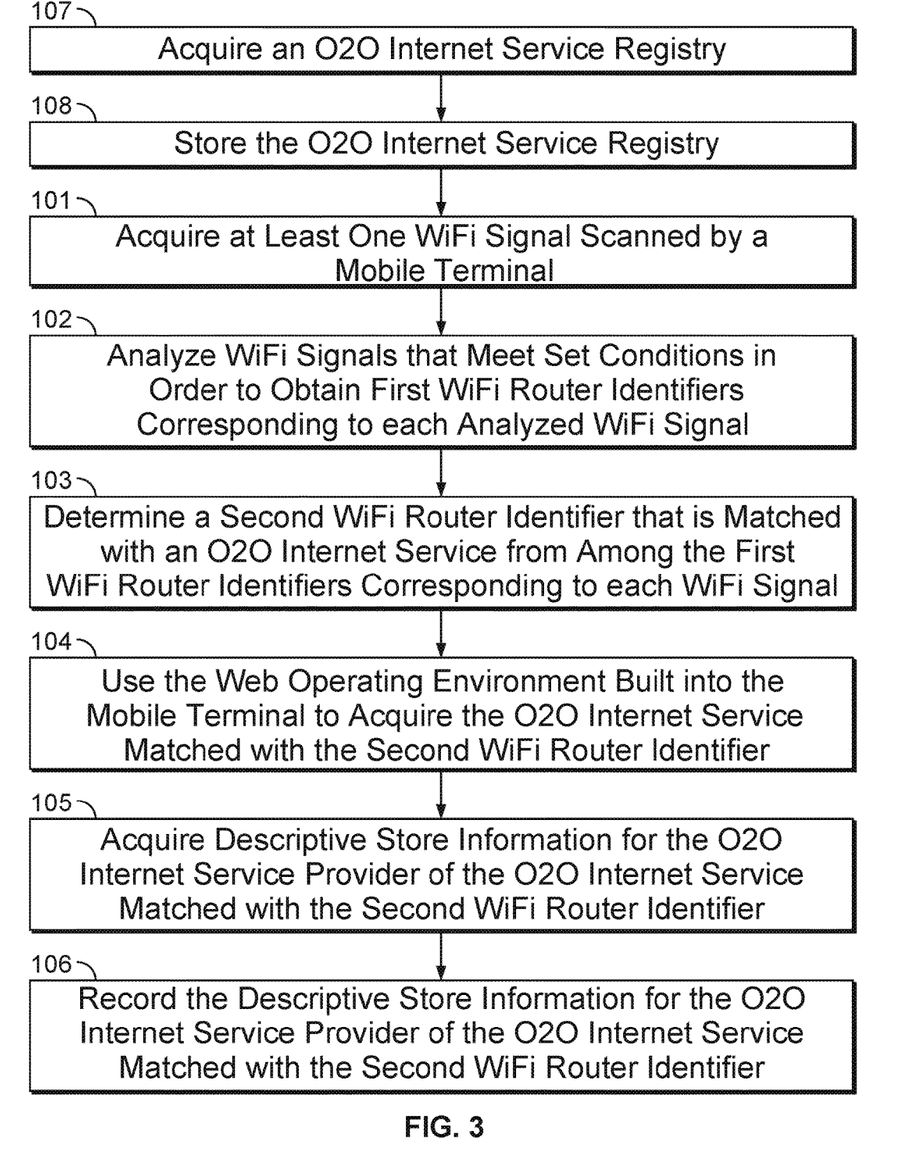
FIG. 3 is a flowchart of a third method of implementing O2O Internet services in an embodiment of the present application.

Refer to FIG. 3, which is a flowchart of a method of implementing O2O Internet services in an embodiment of the present application. Prior to S101, acquiring at least one WiFi signal scanned through a mobile terminal, it further comprises:

S107: Acquire an O2O Internet service registry.

The O2O Internet service registry includes registration information on multiple O2O Internet service providers that provide O2O Internet services, wherein the registration information on O2O Internet service providers comprises: descriptive store information about O2O Internet service providers, O2O Internet service addresses of O2O Internet service providers and WiFi router identifiers for O2O Internet service providers. The descriptive store information is used by mobile terminal users for identifying and shopping, or the descriptive store information is used by mobile terminals for navigation to the store location.

Specifically, in order to implement an O2O Internet service through the method of the present embodiment, the O2O Internet service provider that can provide the O2O Internet service registers in advance on an O2O Internet service platform. When the O2O Internet service provider registers on an O2O Internet service platform, it submits registration information.

S108: Store the O2O Internet service registry.

Figure 4:
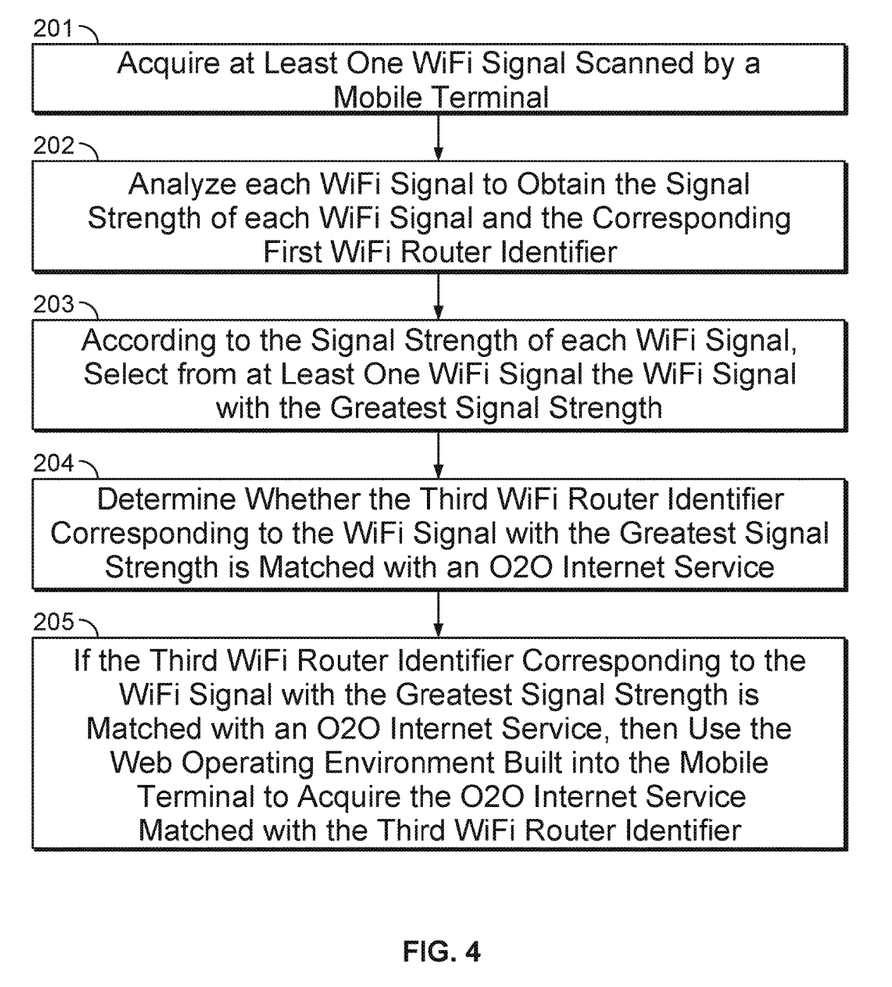
FIG. 4 is a flowchart of a fourth method of implementing O2O Internet services in an embodiment of the present application.

Please note that, where a remote terminal user uses a WiFi router identifier for at least one acquired WiFi signal scanned by the mobile terminal as a basis for searching for O2O Internet services, if the WiFi signals that meet a set condition are: those of the acquired WiFi signals whose strength exceeds a set threshold value or a preset quantity of the acquired WiFi signals ranked in strong-to-weak signal strength order, then multiple O2O Internet services may be found for the mobile terminal user in his or her vicinity. In an actual application, the mobile terminal user might be most concerned about the nearest O2O Internet service. Therefore, the WiFi signal that meets the set condition in the present embodiment is: the strongest WiFi signal among the WiFi signals that were acquired. To provide a further explanation, refer to FIG. 4, which is a flowchart of a method of implementing O2O Internet services in an embodiment of the present application. The method comprises:

S201: Acquire at least one WiFi signal scanned by a mobile terminal.

Specifically, this is similar to step S101 and will not be discussed further here.

S202: Analyze each WiFi signal to obtain the signal strength of each WiFi signal and the corresponding first WiFi router identifier.

S203: According to the signal strength of each WiFi signal, select from the at least one WiFi signal the WiFi signal with the greatest signal strength.

Specifically, according to the signal strength of each WiFi signal, the at least one WiFi signal is ranked in strong-to-weak signal strength order, and the WiFi signal with the greatest signal strength is selected from at least one WiFi signal.

S204: Determine whether the third WiFi router identifier corresponding to the WiFi signal with the greatest signal strength is matched with an O2O Internet service.

Determining whether a third WiFi router corresponding to the WiFi signal with the greatest signal strength is matched with an O2O Internet service comprises:

comparing the third WiFi router corresponding to the WiFi signal with the greatest signal strength to WiFi router identifiers for O2O Internet services registered on an O2O Internet service platform;

if there is a WiFi router identifier among the WiFi router identifiers for registered O2O Internet services on the O2O Internet service platform that is consistent with the third WiFi router identifier, then determine that the third WiFi router identifier is matched with an O2O Internet service;

if there is no WiFi router identifier among all the WiFi router identifiers for registered O2O Internet services on the O2O Internet service platform that is consistent with the third WiFi router identifier, then determine that the third WiFi router identifier is not matched with an O2O Internet service.

S205: If the third WiFi router identifier corresponding to the WiFi signal with the greatest signal strength is matched with an O2O Internet service, then use the Web operating environment built into the mobile terminal to acquire the O2O Internet service matched with the third WiFi router identifier.

Specifically, this is similar to step S104 and will not be discussed further here.

After using the Web operating environment built into the mobile terminal to acquire the O2O Internet service matched with the third WiFi router identifier, it further comprises:

acquiring descriptive store information about the O2O Internet service provider of the O2O Internet service matched with the third WiFi router identifier;

recording descriptive store information about the O2O Internet service provider of the O2O Internet service matched with the third WiFi router identifier.

The method of implementing O2O Internet services described by the present embodiment provides O2O Internet services based on WiFi router identifiers of WiFi signals. Specifically, since all the WiFi signals scanned by a mobile terminal are WiFi signals in the vicinity of the mobile terminal, using the WiFi router identifier for WiFi signals in the vicinity of the mobile terminal as a basis for providing O2O Internet service to the mobile terminal user can happen when the mobile terminal user is indoors and can provide the mobile terminal user accurate O2O Internet service associated with the user's current location. Acquiring at least one WiFi signal scanned by a remote terminal and providing O2O Internet service based on the WiFi signal's WiFi router identifier does not require the remote terminal user to perform any preceding step. The matching is automatic, and the interactions are simple. The O2O Internet service corresponding to the WiFi signal with the greatest signal strength is provided on the basis of the WiFi signal strength and the WiFi router identifier. The O2O Internet service provided for the mobile terminal user is nearer to the mobile terminal user and is more convenient to the user.

Successfully matched O2O Internet services are recorded. That is, visited O2O Internet service provider physical stores are recorded for the convenience of repeat visits by users.

Figure 5:
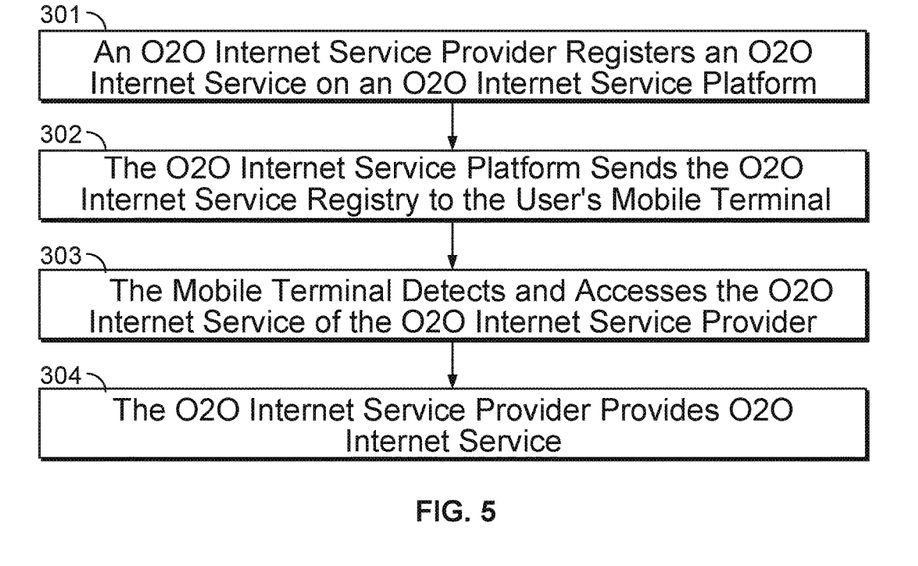
FIG. 5 is a diagram of a particular method of implementing O2O Internet services in an embodiment of the present application.
Figure 6:
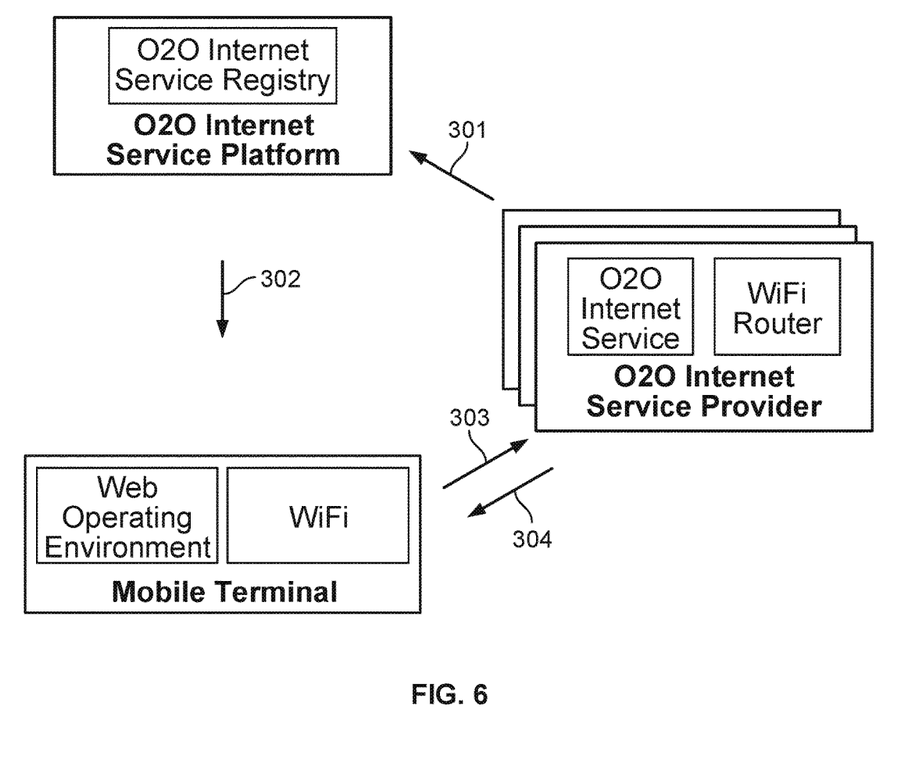
FIG. 6 is a diagram of another particular method of implementing O2O Internet services in an embodiment of the present application.

Refer to FIGS. 5 and 6, which are diagrams of a particular method of implementing O2O Internet services in an embodiment of the present application. The method comprises:

S301: An O2O Internet service provider registers an O2O Internet service on an O2O Internet service platform.

The O2O Internet service provider carries out the registration on the O2O Internet service platform. When the O2O Internet service provider carries out the registration on the O2O Internet service platform, it submits registration information.

The registration information of the O2O Internet service provider comprises: descriptive store information about the O2O Internet service provider, the O2O Internet service address of the O2O Internet service providers and the WiFi router identifier for the O2O Internet service provider.

S302: The O2O Internet service platform sends the O2O Internet service registry to the user's mobile terminal.

The O2O Internet service registry includes registration information on multiple O2O Internet service providers that provide O2O Internet services.

The O2O Internet service platform sends the O2O Internet service registry to the user's mobile terminal. Specifically, the O2O Internet service registry can be sent to the user mobile terminal via the mobile terminal OS push channel. Moreover, whenever the registration information in the O2O Internet service registry is updated, it will be synchronized with the user remote terminal based on the mobile terminal OS push channel.

S303: The mobile terminal detects and accesses the O2O Internet service of the O2O Internet service provider.

If, when the user arrives within the vicinity of the physical store of the O2O Internet service provider, his or her mobile terminal's WiFi is on, the mobile terminal OS (e.g., Android) automatically scans for WiFi signals in the vicinity and detects at least one WiFi signal sent by a broadcasting mechanism.

To make it possible to acquire in real time at least one WiFi signal sent by a broadcasting mechanism, it is possible to register and monitor broadcasts for WiFi signal scans and acquire in real time at least one most recently scanned WiFi signal sent by a broadcasting mechanism.

Moreover, during an actual application, each WiFi signal of the at least one WiFi signal that was acquired by remote terminal scanning can be analyzed, and the WiFi router identifier of each WiFi signal serves as a basis for finding O2O Internet services for the mobile terminal user. It is possible that multiple O2O Internet services will be found for the mobile terminal user within his or her vicinity. Moreover, each WiFi signal of the at least one WiFi signal that was acquired by remote terminal scanning can be analyzed, and the WiFi router identifier of the WiFi signal with the greatest signal strength serves as a basis for finding an O2O Internet service for the mobile terminal user. The O2O Internet service nearest to the remote terminal user may be found.

S304: The O2O Internet service provider provides O2O Internet service.

If an O2O Internet service is found using a WiFi signal, then the mobile terminal user is definitely located inside the physical store or in the vicinity of the physical store. Therefore, the application scenarios of the O2O Internet services of the present embodiment may include:

a: Automatic Recommendation of a Menu and Online Ordering

After the mobile terminal user uses the O2O Internet service, he or she can obtain special-price and special-dish menus recommended by the O2O Internet service and can directly place an order. This can solve the problem of insufficient information in traditional menus and can also help the O2O Internet service provider save on service costs.

b: Waiting in Line and Having Your Number Called

After a restaurant clears tables, and after a mobile terminal user uses the O2O Internet network service, it is possible to join the online queue until one's number is called. The O2O Internet service provider may send a message to the user's mobile terminal notifying him or her of the availability of a table, thereby solving the problem of users needing to wait near the restaurant.

c: Automatic Recommendations of Hot Products and Online Payment and Orders

After a mobile terminal user who is browsing products in a store uses an O2O Internet service, he or she can see recommended hot products. This enables the user to save on product searching time.

d: Automatically Sending Coupons

When a mobile terminal user is passing by a store, a store coupon may be automatically sent based on a notification center for the purpose of drawing the user into the store to spend. It's also an even more convenient way for users to use coupons.

e: Automatically Connecting to a WiFi Signal

When a mobile terminal user is in a physical store or in the vicinity of a physical store, a WiFi code is automatically sent to the mobile terminal enabling the mobile terminal to automatically connect with the WiFi signal and to use the WiFi signal to connect to the Internet.

Figure 7:
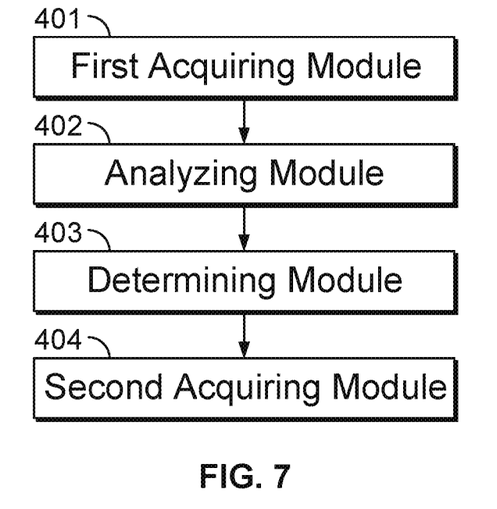
FIG. 7 is a structural diagram of a first device for implementing O2O Internet services in an embodiment of the present application.

As shown in FIG. 7, which is a structural diagram of a device for implementing O2O Internet services in an embodiment of the present application, the device comprises:

a first acquiring module 401, for acquiring at least one WiFi signal scanned by a mobile terminal;

an analyzing module 402, for analyzing WiFi signals that meet set conditions in order to obtain first WiFi router identifiers corresponding to each analyzed WiFi signal;

a determining module 403, for determining a second WiFi router identifier that is matched with an O2O Internet service from among the first WiFi router identifiers corresponding to each WiFi signal;

a second acquiring module 404, for using the Web operating environment built into a mobile terminal to acquire an O2O Internet service matched with a second WiFi router identifier.

Furthermore, the determining module 403 comprises:

a comparing unit, for comparing the first WiFi router identifier corresponding to each WiFi signal with WiFi router identifiers for O2O Internet services registered on an O2O Internet service platform;

a determining unit, for determining the first WiFi router identifier whose comparison result is the same to be the second WiFi router identifier, which is matched with an O2O Internet service.

Figure 8:
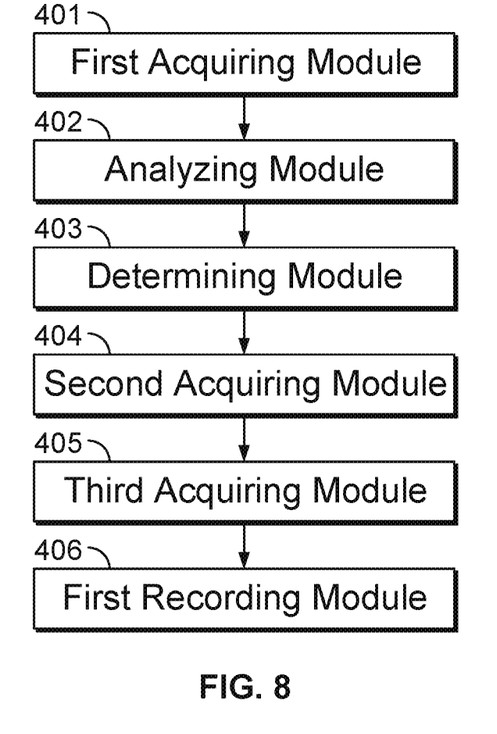
FIG. 8 is a structural diagram of a second device for implementing O2O Internet services in an embodiment of the present application.

Furthermore, refer to FIG. 8. The device further comprises:

a third acquiring module 405, for acquiring descriptive store information for an O2O Internet service provider of an O2O Internet service matched with the second WiFi router identifier;

a first recording module 406, for recording the descriptive store information for an O2O Internet service provider of an O2O Internet service matched with the second WiFi router identifier.

Furthermore, WiFi signals that meet set conditions comprise:
the strongest WiFi signal among the acquired WiFi signals; or
those acquired WiFi signals whose strength exceeds a set threshold value; or
a preset quantity of acquired WiFi signals ranked in strong-to-weak signal strength order.

Figure 9:
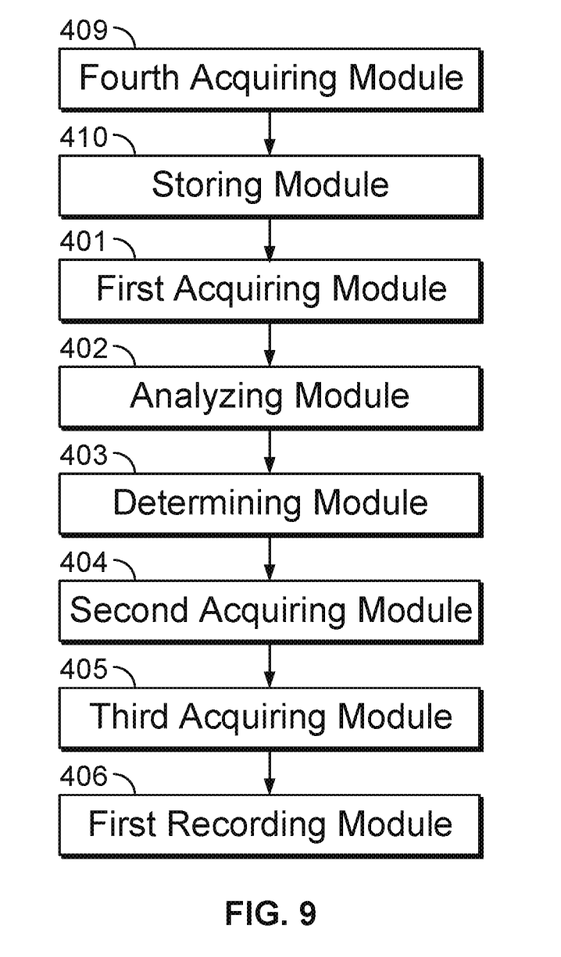
FIG. 9 is a structural diagram of a third device for implementing O2O Internet services in an embodiment of the present application.

Furthermore, refer to FIG. 9. The device further comprises:
a fourth acquiring module 409, for acquiring an O2O Internet service registry, wherein the O2O Internet service registry comprises registration information on multiple O2O Internet service providers that provide O2O Internet services, wherein the registration information on O2O Internet service providers comprises O2O Internet service addresses of O2O Internet service providers and WiFi router identifiers for O2O Internet service providers;
a storage module 410, for storing the O2O Internet service registry.

Furthermore, the O2O Internet service provider registration information further comprises:
descriptive store information about O2O Internet service providers, wherein the descriptive store information is used by mobile terminal users for identifying and shopping, or the descriptive store information is used by mobile terminals for navigation to the store location.

Furthermore, the second acquiring module 404 comprises:
a processing unit, for using the second WiFi router identifier as a basis for determining an O2O Internet service address included in the corresponding registration information;
an acquiring unit, for using the O2O Internet service address as a basis for acquiring an O2O Internet service matched with the second WiFi router identifier.

Figure 10:
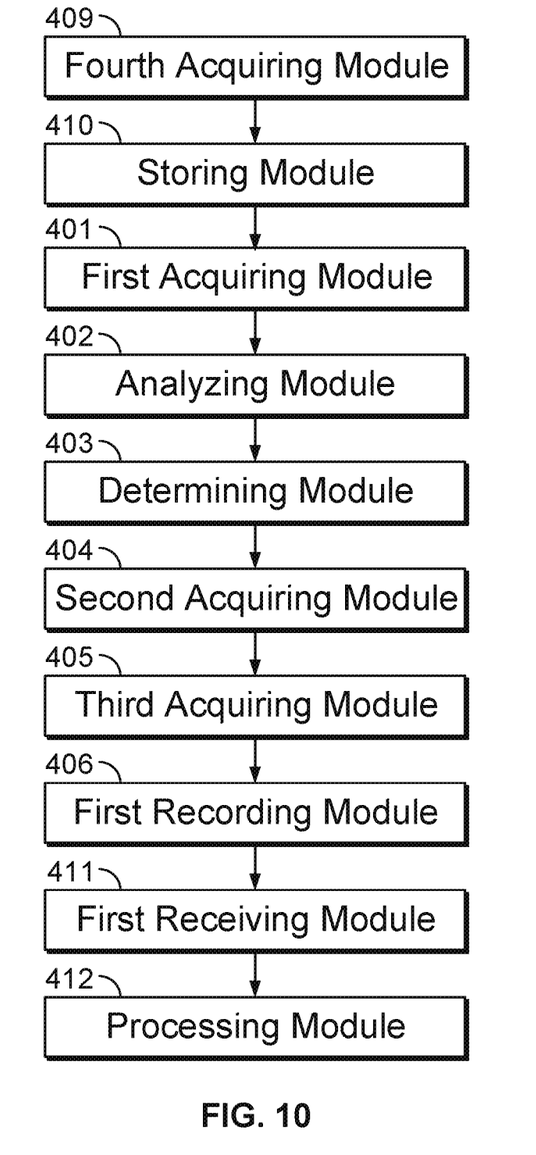
FIG. 10 is a structural diagram of a fourth device for implementing O2O Internet services in an embodiment of the present application.

Furthermore, refer to FIG. 10. The device further comprises:
a first receiving module 411, for receiving the WiFi code that is sent by the WiFi router corresponding to the second WiFi router identifier;
a processing module 412, for on the basis of the WiFi code using the WiFi signal provided by the WiFi router corresponding to the second WiFi router identifier to connect to the Internet.

Figure 11:
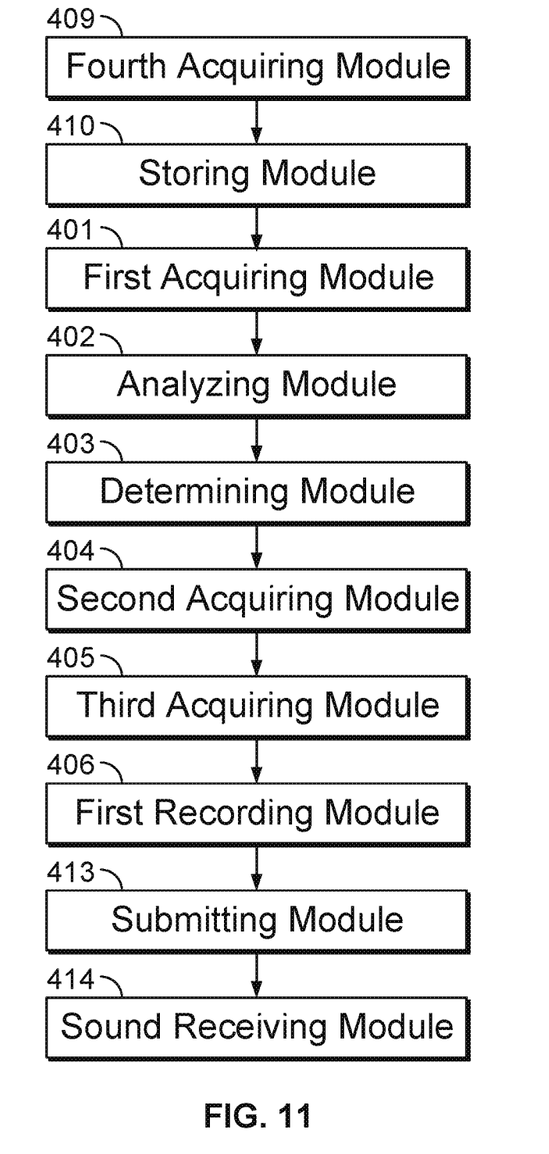
FIG. 11 is a structural diagram of a fifth device for implementing O2O Internet services in an embodiment of the present application.

Furthermore, refer to FIG. 11. The device further comprises:
a submitting module 413, for using the mobile terminal to log on to an O2O Internet service matched with the second WiFi router identifier and submitting service subscription information;
a second receiving module 414, for receiving service subscription result information corresponding to said service subscription information.

Furthermore, the second acquiring module 404 comprises:
a first receiving unit, for using the Web operating environment built into a mobile terminal to receive an O2O Internet service pushed by an O2O Internet service provider matched with a second WiFi router identifier; or
a second receiving unit, for, after receiving a service acquisition trigger instruction, using the Web operating environment built into a mobile terminal to acquire an O2O Internet service matched with a second WiFi router identifier.

Furthermore, the O2O Internet service comprises:
pushed information provided by the O2O Internet service provider, or
service information provided by the O2O Internet service provider, or
descriptive information provided by the O2O Internet service provider.

The device for implementing O2O Internet services described by the present embodiment provides O2O Internet services based on WiFi router identifiers of WiFi signals. Specifically, since all the WiFi signals scanned by a mobile terminal are WiFi signals in the vicinity of the mobile terminal, using the WiFi router identifier for WiFi signals in the vicinity of the mobile terminal as a basis for providing O2O Internet service to the mobile terminal user can happen when the mobile terminal user is indoors and can provide the mobile terminal user accurate O2O Internet service associated with the user's current location. Acquiring at least one WiFi signal scanned by a remote terminal and providing O2O Internet service based on the WiFi signal's WiFi router identifier does not require the remote terminal user to perform any preceding step. The matching is automatic, and the interactions are simple. The O2O Internet service corresponding to the WiFi signal with the greatest signal strength is provided on the basis of the WiFi signal strength and the WiFi router identifier. The O2O Internet service provided for the mobile terminal user is nearer to the mobile terminal user and is more convenient to the user.

Said device corresponds to the description of the aforesaid method steps. Where the information is insufficient, refer to the explanations of the aforesaid method steps. They will not be discussed in detail again.

The explanations above present and describe a number of preferred embodiments of the present application. However, as stated above, it should be understood that the present application is not limited to the forms disclosed in this document and should not be regarded as excluding other embodiments. Rather, they can be used in various other combinations, modifications and environments. Moreover, within the scope of the inventive concepts described herein, they can be altered using the instructions above or the techniques or knowledge of the associated fields. Alterations or changes made by persons skilled in the art that do not depart from the spirit and scope of the present application shall be within the protective scope of the claims attached to the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining, by a mobile terminal, one or more wireless signals respectively associated with one or more corresponding network devices;
obtaining, by the mobile terminal, one or more network device identifiers associated with at least one of the one or more wireless signals based at least in part on analysis of the one or more wireless signals;
determining, by the mobile terminal, that at least one of the one or more network device identifiers corresponds to an Internet service, wherein the Internet service is dependent at least in part on a physical location of a terminal associated with the wireless signal; and accessing, by the mobile terminal, the Internet service associated with the at least one of the one or more network device identifiers corresponding to the Internet service.

2. The method of claim 1, wherein the one or more network device identifiers corresponding to one or more WiFi router identifiers respectively associated with the corresponding one or more network devices.

3. The method of claim 1, wherein the obtaining the one or more network device identifiers comprises determining the one or more network device identifiers based at least in part on information obtained from the respective one or more wireless signals.

4. The method of claim 1, wherein the determining that the at least one of the one or more wireless signals corresponds to the Internet service comprises comparing the one or more network device identifiers associated with the at least one of the one or more wireless signals with a mapping of registered Internet services to network device identifiers.

5. The method of claim 1, wherein the one or more wireless signals are obtained by a terminal, and wherein the obtaining of the Internet service comprises using a web operating environment of the terminal.

6. The method of claim 1, wherein accessing of Internet service comprises connecting to the at least one of the one or more wireless signals that corresponds to the Internet service and obtaining information associated with the Internet service from the at least one of the one or more wireless signals that corresponds to the Internet service.

7. The method of claim 6, wherein the information associated with the Internet service is pushed to one or more terminals connected to the at least one of the one or more wireless signals by at least one of the one or more network devices corresponding to the at least one of the one or more wireless signals that corresponds to the Internet service.

8. The method of claim 6, wherein the information associated with the Internet service is associated with a current location of a terminal that obtained the at least one of the one or more wireless signals.

9. The method of claim 1, wherein accessing the Internet service comprises selecting an Internet service wireless signal from among the one or more wireless signals based at least in part on a wireless signal strength.

10. The method of claim 9, wherein selecting the Internet service wireless signal comprises determining whether the one or more wireless signals exceed a threshold signal strength.

11. The method of claim 1, wherein accessing the Internet service comprises determining whether the at least one of the one or more wireless signals corresponding to the O2O Internet service satisfies one or more conditions for Internet services.

12. The method of claim 1, wherein information for one or more Internet services is registered with a platform, wherein registration of the information for the one or more Internet services comprises registration of a corresponding network device identifier providing the one or more Internet services.

13. The method of claim 12, wherein the information for one or more Internet services comprises descriptive information of one or more stores respectively associated with the one or more Internet services.

14. The method of claim 1, wherein obtaining the Internet service comprises receiving a selection of at least one of the one or more wireless signals from a user to receive the Internet service.

15. The method of claim 1, further comprising: obtaining descriptive store information based at least in part on at least one of the one or more network device identifiers that correspond to the at least one of the one or more wireless signals corresponding to the Internet service.

16. A mobile terminal comprising:
one or more processors configured to:
obtain one or more wireless signals respectively associated with one or more corresponding network devices;
obtain one or more network device identifiers associated with at least one of the one or more wireless signals based at least in part on analysis of the one or more wireless signals;
determine that at least one of the one or more wireless signals corresponds to an Internet service, wherein the Internet service is dependent at least in part on a physical location of a terminal associated with the wireless signal; and
accessing the Internet service associated with the at least one of the one or more network device identifiers corresponding to the Internet service; and
a memory coupled to the one or more processors and configured to provide the one or more processors with instructions.

17. A computer program product, the computer program product being embodied in a non-transitory computer readable storage medium and comprising computer instructions for:
obtaining, by a mobile terminal, one or more wireless signals respectively associated with one or more corresponding network devices;
obtaining, by a mobile terminal, one or more network device identifiers associated with at least one of the one or more wireless signals based at least in part on analysis of the one or more wireless signals;
determining, by a mobile terminal, that at least one of the one or more wireless signals corresponds to an Internet service, wherein the Internet service is dependent at least in part on a physical location of a terminal associated with the wireless signal; and
accessing, by a mobile terminal, the Internet service associated with the at least one of the one or more network device identifiers corresponding to the Internet service.

* * * * *